United States Patent
Machiussi

[19]

[11] Patent Number: 6,086,020
[45] Date of Patent: Jul. 11, 2000

[54] RELEASABLE PAYLOAD SHELL FOR CONNECTING A PAYLOAD FAIRING, A PAYLOAD AND A PAYLOAD PROPULSION UNIT

[75] Inventor: Mario Machiussi, Zweidlen, Switzerland

[73] Assignee: Contraves Space AG, Zurich, Switzerland

[21] Appl. No.: 09/105,552

[22] Filed: Jun. 26, 1998

[30] Foreign Application Priority Data

Jun. 27, 1997 [CH] Switzerland .............................. 1552/97

[51] Int. Cl.[7] ...................................................... B64G 1/00
[52] U.S. Cl. ...................................................... 244/158 R
[58] Field of Search .............................. 244/158 R, 160; 102/378

[56] References Cited

U.S. PATENT DOCUMENTS

| | | | |
|---|---|---|---|
| 3,576,298 | 4/1971 | Barnett et al. ................................ | 244/1 |
| 3,706,281 | 12/1972 | Hatakeyama ............................ | 102/49.5 |
| 4,699,062 | 10/1987 | Lewis et al. .............................. | 102/378 |
| 5,322,248 | 6/1994 | Ragab ...................................... | 244/160 |
| 5,331,894 | 7/1994 | Wassell et al. ...................... | 102/275.12 |
| 5,372,071 | 12/1994 | Richards et al. ......................... | 102/378 |
| 5,585,596 | 12/1996 | Richards et al. ......................... | 102/378 |

*Primary Examiner*—Robert P. Swiatek
*Attorney, Agent, or Firm*—Townsend and Townsend and Crew; Guy W. Chambers, Esq.

[57] ABSTRACT

A payload section (14) of a rocket, having a payload fairing (16) and a center section (18), which comprises a payload (20) and a payload propulsion unit (22) arranged behind the payload (20) and connected with the payload (20). For preventing, or respectively limiting, a mutual relative movement, the payload fairing (16) and the center section (18) are connected by means of a connection arrangement, which is attached to the payload fairing (16) and also releasably to the center section (18). The connection arrangement is embodied as a preferably flat shell (24), which can consist of two partial shells (24.1, 24.2), which are releasably fastened to each other.

8 Claims, 2 Drawing Sheets

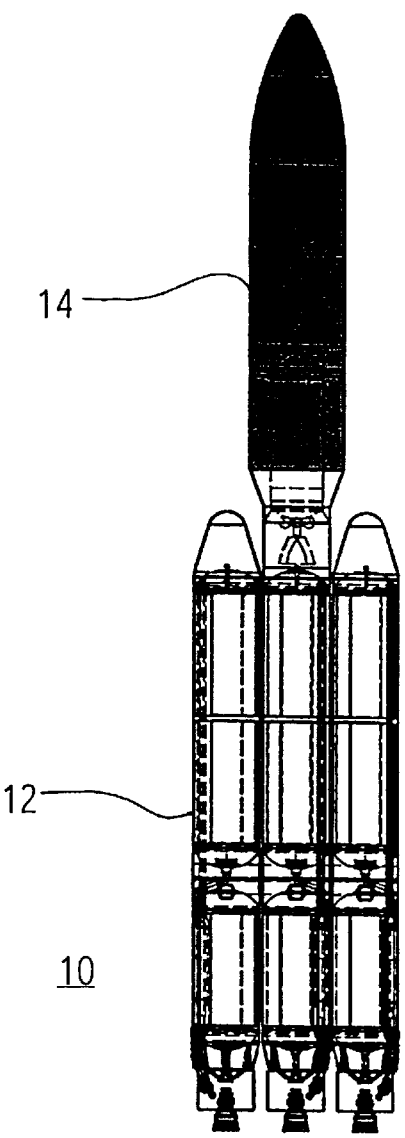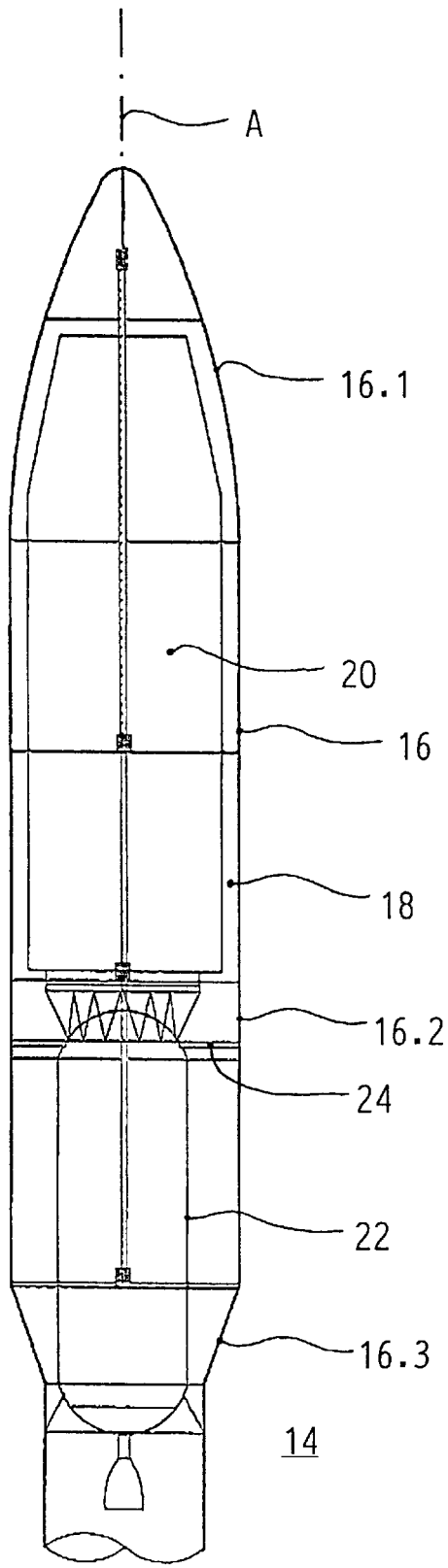
Fig. 1
Fig. 2

RELEASABLE PAYLOAD SHELL FOR CONNECTING A PAYLOAD FAIRING, A PAYLOAD AND A PAYLOAD PROPULSION UNIT

FIELD OF THE INVENTION

The invention relates to a payload section of a rocket, having a payload fairing and a center section, which is arranged therein coaxially with the payload fairing and which comprises a payload and a payload propulsion unit, wherein the payload fairing and the center section are connected by means of a releasable connection arrangement, which is fastened on both the payload fairing and the center section and which limits relative displacement between the payload fairing and the center section.

BACKGROUND OF THE INVENTION

A rocket intended for launch into space comprises a rocket section and a payload section, arranged in front of the rocket section in the launch direction, wherein the rocket section is used for transporting the payload section into space. The rocket portion can include several stages, and the payload section essentially consists of the actual payload which, if required, can be separated into several payload units, of a payload propulsion unit for affecting movement of the payload after its separation from the rocket portion, and of a payload fairing, wherein the actual payload and the payload propulsion unit constitute a center section of the payload section. The longitudinal axes of the rocket, of the payload fairing, of the payload and of the payload propulsion unit are combined. The last stage of the rocket section is separated from the payload section no later than reaching the destination of the payload in space, and the payload fairing is removed. So that the rocket moves on its predetermined trajectory, it is necessary to prevent, or at least greatly limit, the relative displacement between the payload fairing and the center section, formed by the payload and the payload propulsion unit fixedly connected with the payload. It is particularly intended to maintain the original coaxial arrangement of the payload fairing and the center section.

In order to prevent relative displacement between the payload fairing and the center section, or at least to limit it to a small amount, it is customary to install a connecting arrangement between the payload fairing and the center section, generally at the level of the payload propulsion unit, by means of which the distance between them is fixed. This connecting arrangement can be provided by several rods, for example, which bridge the free space between the payload fairing and the center section and which are generally arranged in a plane which is perpendicular in respect to the longitudinal axis, wherein one end of each road is attached to the payload fairing, and the other end to the center section. The rods act as spacers, so to speak, between the payload fairing and the center section, and prevent relative movements between them. In general, the arrangement of the rods is provided in a plane which is perpendicular in relation to the longitudinal axis, since relative radial movements in particular are intended to be prevented. The lines of influence of the forces transmitted through the rods do of course coincide with the direction of the rods. However, neither the center section nor the payload fairing should be stressed in the radial direction. For reason the rods are arranged tangentially in relation to the center section. Because of this they meet the payload fairing in the direction of a secant, so that the force acting on the payload fairing is composed of a radial component and a tangential component. The larger the difference between the diameters of the payload fairing on the one hand and the center section on the other hand, the more the radial component is preponderant in the force acting on the payload fairing. Such an arrangement of forces is disadvantageous for the payload fairing. Not only do relatively large radial forces act on the payload fairing, something which cannot be avoided, but large stress peaks are generated because of the point-to-point force transfer through the rods at the location where they are attached.

In order not to be forced to make the entire payload fairing stronger, and therefore heavier, but still to prevent damage to it in the area of the rod attachments, it had been attempted to provide the payload fairing with a reinforcement ring which, however, for providing a sufficient effect, must be designed to be comparatively strong and therefore heavy, which again results in an undesirable increase in the mass of the payload fairing.

It should be noted that no constructive solutions are known up to now, which would provide an efficient and at the same time low-mass, releasable connection between the payload fairing and the center section of the payload section of a rocket.

OBJECT AND SUMMARY OF THE INVENTION

It is therefore the object of the invention to propose a payload section of a rocket of the type mentioned at the outset, with a payload fairing and a center section, which avoids the mentioned disadvantages, wherein a dependable releasable connection arrangement, which is low in stress peaks, is provided for the connection between the payload fairing and the center section.

This object is attained in accordance with the invention by means of the features of the characterizing portion of claim 1. Advantageous further developments are defined in claims 2 to 8, which depend from claim 1.

Thus, in accordance with the invention, the payload is designed in such a way that the connection arrangement disposed between the payload fairing and the center section is formed by a shell of reduced wall thickness, which covers the free space between the payload fairing and the center section. This design of the connection arrangement results in the forces no longer being transmitted at points, but along a sector of a circle, or respectively more accurately stated, along a cylinder envelope of small height, wherein this height essentially corresponds to the wall thickness of the shell.

A material produced in a sandwich construction from plastic is an advantageous material for the shell.

Usefully, the shell is essentially formed in a dynamically balanced manner.

Therefore the shell has the shape of a rotational solid, wherein its generatrix can be a straight line or a curve. In the first case, the shell is an envelope of a truncated cone, in the latter case a twice curved surface.

In a preferred embodiment the shell is flat and forms a circular ring.

To save mass, the shell can be provided with openings. These openings can start at one or both the circular edges of the shell, and can therefore lend a certain resilience to the shell, so that its damage can possibly be prevented. However, the openings are preferably designed in such a way that they are bordered on all sides by the material of the shell.

In view of the assembly of the payload section as well as the later separation of the payload section, including the payload propulsion unit, from the shell and from the payload fairing, it is advantageous to make the shell of several partial shells, which are releasably fastened to each other. A flat shell made from two equal partial shells with a layout in the shape of half a circular ring has been shown to be particularly advantageous.

Releasable fastening devices have been provided at several locations of the novel payload section, wherein the payload fairing and the center section are connected by a shell in accordance with the invention.

A releasable center section fastening between the center section and the shell is necessary in every case.

A releasable payload fastening between the shell and the payload is furthermore required.

When using a shell made of several partial shells, it is also necessary to fasten the latter to each other by means of shell fasteners.

The partial shells are preferably released from each other by means of a spring force, wherein the required spring force can be triggered by an explosive effect.

Several spring assemblies are provided in a preferred embodiment, each one of which is received in a housing fastened at neighboring edge areas of the two partial shells and which prestresses the spring assembly contained in it under pressure. Explosive bolts are associated with the housings. When they are actuated, an explosive effect is created, which opens the housing, which results in the expansion of the spring assemblies and therefore in the exertion of a spring force for the purpose of separating the partial shells.

Further details and advantages of the invention will be extensively described in what follows by means of an exemplary embodiment, making reference to the drawings.

BRIEF DESCRIPTION OF THE DRAWINGS

FIG. 1 is a lateral view of a rocket with a payload section and a rocket section, FIG. 2 represents a sectional view along the axis of the payload section of the rocket shown in FIG. 1.

DETAILED DESCRIPTION OF THE PREFERRED EMBODIMENT

Figure 3:
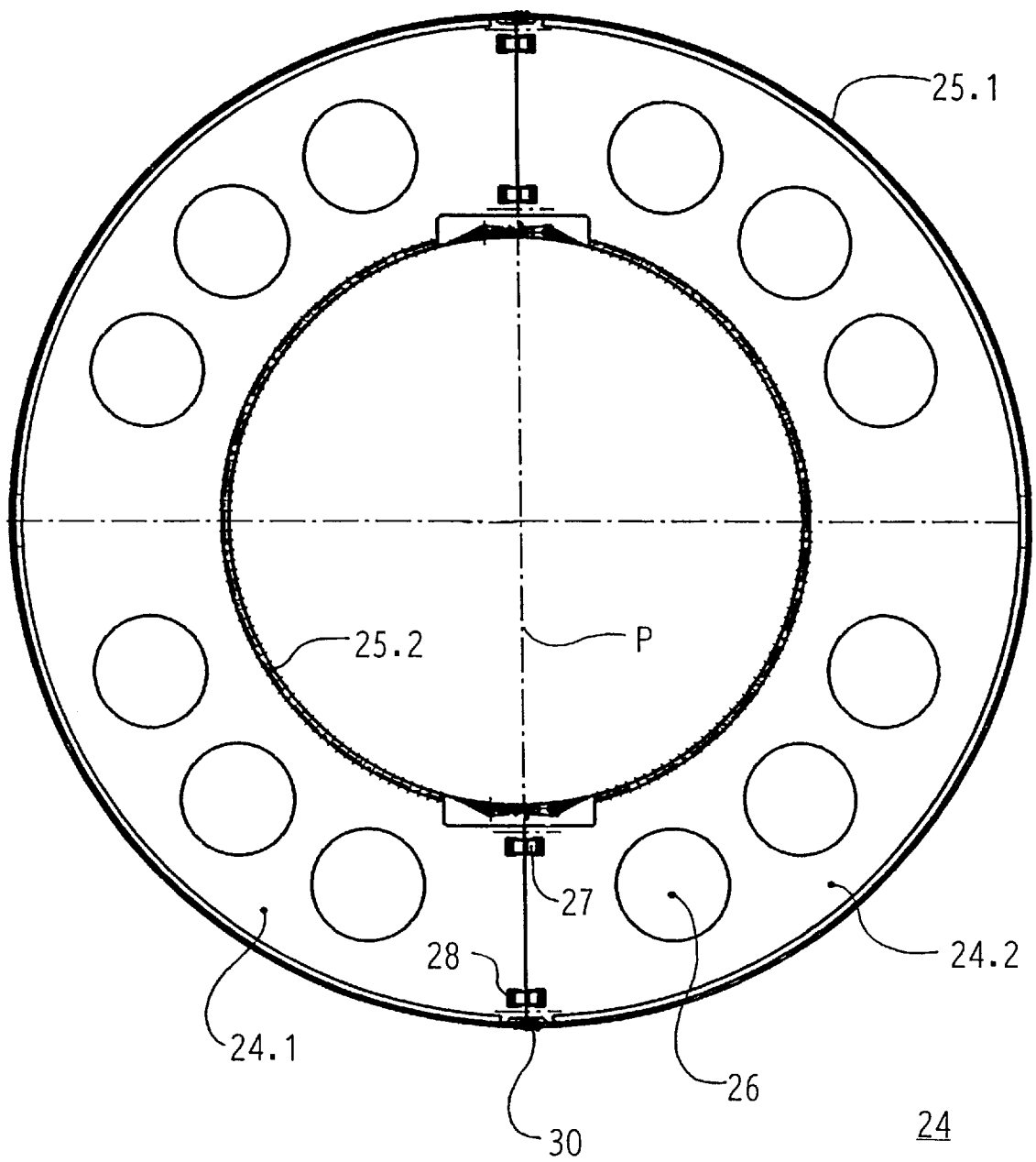
FIG. 3 represents a top view of a shell in a flat embodiment, which connects the payload and the center section.

The rocket 10 represented in FIG. 1 has a rocket section 12 and a payload section 14, which is arranged above, or respectively in front in the direction of flight, of the rocket section 10.

In accordance with FIG. 2, the payload section 14 comprises a payload fairing 16, in which the actual payload 20 and a payload propulsion unit 22 are arranged as the center section 18. The payload fairing 16 has a front end in the shape of an ogive 16.1, and a cylindrical area 16.2 adjoining the ogive 16.1, a boat tail 16.3 of the payload fairing 16 follows this cylindrical area 16.2 toward the rear toward the axis A.

The center section 18 of the payload section 14 of the rocket 10 is arranged concentrically in relation to the payload fairing 16 and in its interior, which includes the payload 20 and the payload propulsion unit 22, wherein the payload propulsion unit 22 is intended to affect the movement of the payload section 14 after separation from the rocket section 10.

A flat shell 24, which is represented in FIG. 3, connects the payload fairing 16 and the center section 18 at the level of the payload propulsion unit 22. The shell 24 has the shape of a circular ring, whose exterior diameter 25.1 corresponds to the interior diameter of the payload fairing 16, and whose interior diameter 25.2 corresponds to the exterior diameter of the center section 18, respectively at the location of the shell 24. The shell 24 is divided into two essentially equal partial shells 24.1, 24.2, which are releasably fastened to each other, by a longitudinal plane P containing the longitudinal axis of the rocket 10. Both partial shells 24.1, 24.2 are provided with several openings 26, which are completely surrounded by the material of the shell 24.

The partial shells 24.1, 24.2 are fastened to each other, wherein this fastening is designed in such a way that it can be released for separating the center section 18 from the payload fairing 16. Spring assemblies 27, which are located in housings 28, are arranged in the respectively adjoining edge areas of the partial shells 24.1, 24.2 in the vicinity of the longitudinal plane P. The housings 28, which extend on both sides of the longitudinal plane P in the said radial edge areas of the partial shells 24.1, 24.2, prestress the spring assemblies 26 by pressure. An explosive bolt 30 is assigned to each housing 28. When the explosive bolt 30 is actuated, the housing 28 is opened, which results in the two partial shells 24.1, 24.2 moving away from each other because of the force of the now released spring assemblies 26.

What is claimed is:

1. A payload section of a rocket comprising a payload fairing as well as a payload and a payload propulsion unit enclosed within said payload fairing wherein the payload fairing, the payload and the payload propulsion unit are connected by means of a releasable connection arrangement including a connecting shell which is fastened to the payload fairing and the payload and contacts the payload propulsion unit to limit relative displacement between the payload fairing, the payload and the payload propulsion unit.

2. The payload section in accordance with claim 1, wherein said shell is made of plastic.

3. The payload section in accordance with claim 1, wherein
    said shell is dynamically balanced.

4. The payload section in accordance with claim 1, wherein
    said shell is flat.

5. The payload section in accordance with claim 1, wherein to reduce its weight or its rigidity, said shell has openings.

6. The payload section in accordance with claim 1, wherein
    said shell is constituted by at least two sector-shaped partial shells which are releasably fastened to each other.

7. The payload section in accordance with claim 6, wherein
    said partial shells can be separated from each other by a spring force which can be triggered by an explosive effect.

8. The payload section in accordance with claim 7, further comprising housings, which are fastened in adjoining edge areas of said partial shells, to prestress spring assemblies arranged inside them under pressure, and that explosive bolts are assigned to said housings, said explosive bolts are provided for generating the explosive effect for opening said housings for the purpose of releasing the spring force.

* * * * *